US006714218B1

(12) United States Patent
Bian

(10) Patent No.: US 6,714,218 B1
(45) Date of Patent: Mar. 30, 2004

(54) SCALING IMAGES

(75) Inventor: Qixiong J. Bian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 09/655,236

(22) Filed: Sep. 5, 2000

(51) Int. Cl.[7] .............................................. G06T 17/00
(52) U.S. Cl. ...................................... 345/764; 345/629
(58) Field of Search ................................ 345/762, 765, 345/744, 764, 790, 529

(56) References Cited

U.S. PATENT DOCUMENTS

| 4,546,349 | A |   | 10/1985 | Prohofsky et al. |         |
|-----------|---|---|---------|------------------|---------|
| 5,053,886 | A |   | 10/1991 | Nakajima         |         |
| 5,638,501 | A | * | 6/1997  | Gough et al.     | 345/435 |
| 5,850,232 | A | * | 12/1998 | Engstrom et al.  | 345/431 |
| 5,949,432 | A | * | 9/1999  | Gough et al.     | 345/435 |
| 6,154,600 | A | * | 11/2000 | Newman et al.    | 348/715 |
| 6,184,906 | B1| * | 2/2001  | Wang et al.      | 345/521 |
| 6,388,668 | B1| * | 5/2002  | Elliott          | 345/474 |
| 6,501,441 | B1| * | 12/2002 | Ludtke           | 345/503 |

OTHER PUBLICATIONS

Patent Abstract of Japan, vol. 010, No. 325 (E–451), Nov. 6, 1986.
J.D. Foley, et al., *Computer Graphics: Principles and Practice;* 1996, Addison–Wesley Publishing Company, Inc., Reading, Mass., USA, pp. 179–184.

* cited by examiner

*Primary Examiner*—Cao (Kevin) Nguyen
(74) *Attorney, Agent, or Firm*—Trop, Pruner & Hu, P.C.

(57) ABSTRACT

A method and apparatus for scaling is provided. The method comprises enabling a user to identify at least a portion of an image on a display device. The method comprises enabling scaling of an electronic representation of the portion of the image using an overlay engine. The apparatus comprises a controller and a video overlay engine that is coupled to the controller. The controller is provided to receive user selected information associated with at least a portion of an image on a display device. The video overly engine is provided to scale an electronic representation of the portion of the image using a video overlay engine.

27 Claims, 5 Drawing Sheets

SCALING IMAGES

BACKGROUND

This invention relates generally to processor-based systems, and, more particularly, to scaling an image on a display device of a processor-based system.

The ability to scale selected images, which may comprise pictures, text, graphics, and the like, on a display device of a processor-based system is generally a useful feature for processor-based system users. The visually impaired, for example, may utilize software applications that magnify contents of a display device of a processor-based system for better viewing. Additionally, users of graphically-oriented applications may wish to enlarge or magnify contents of a processor-based system display for a clearer or more detailed visual image.

Conventional methods of scaling images sometimes employ simple scaling algorithms, such as using replicating algorithms to enlarge or shrink images. As a result, in some instances, the scaled images may appear to have rougher (e.g., jagged) edges. Additionally, it is possible that some conventional scaling methods may not scale as expeditiously as desired, particularly when portions of large, complicated graphic images are being scaled to different sizes.

When scaling, in some instances, it is desirable to dynamically update the scaled image. That is, it is sometimes desirable to "dynamically" update the scaled image so as to save the user from having to refresh or re-scale the underlying image, each time it is altered.

Thus, there is a need for a better way to scale images.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
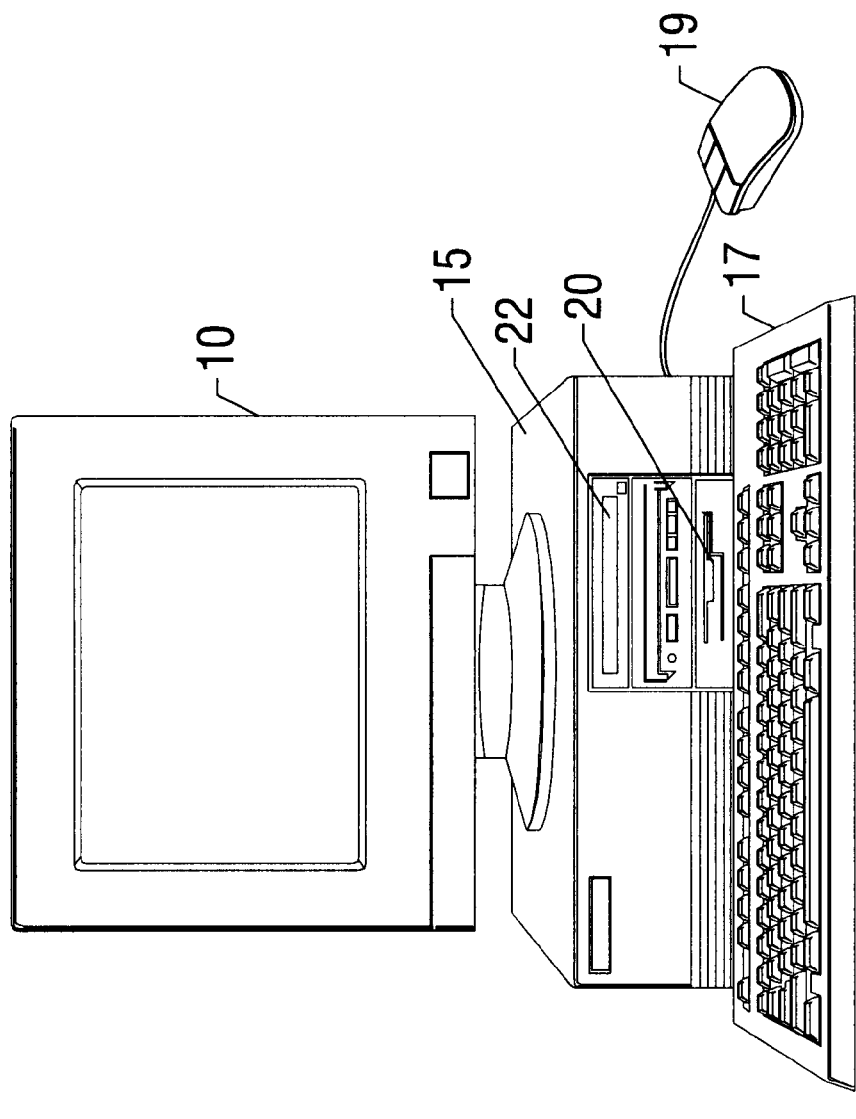
FIG. 1 is a front elevational view of a processor-based system, in accordance with one embodiment of the present invention.

Referring now to FIG. 1, a processor-based system 5 is shown in accordance with one embodiment of the present invention. The processor-based system 5 may be a laptop, desktop, main frame, television with a setup box, or any other device in which scaling is desirable. The processor-based system 5 comprises a display device 10 coupled to a control box 15. Input devices, a keyboard 17 and a mouse 19, are coupled to the control box 15. Generally, the control box 15 relays information to a user through the display device 10 to which the user responds using one of the input devices 17, 19. The processor-based system 5 includes one or more media devices 20, 22. Although not so limited, in the illustrated embodiment, the media devices 20, 22 comprise a diskette and compact disc (CD) drive.

Figure 2:
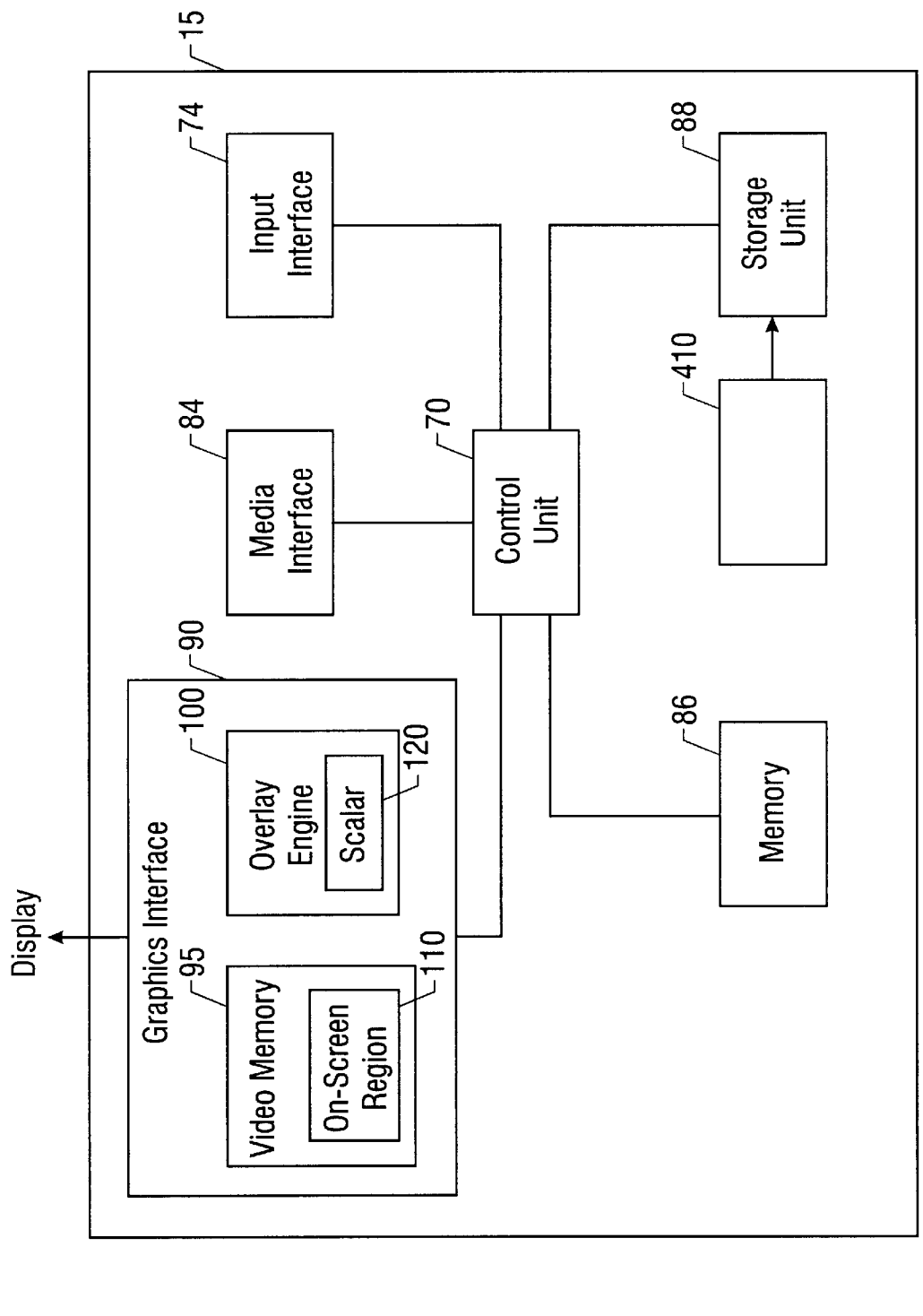
FIG. 2 is a stylized block diagram of the a processor-based system in accordance with the present invention.

Referring now to FIG. 2, a stylized block diagram of the control box 15 of the processor-based system 5 of FIG. 1 is illustrated. For clarity and ease of illustration, only selected functional blocks of the control box 15 are illustrated in FIG. 2, although those skilled in the art will appreciate that the control box 15 may comprise additional functional blocks.

The processor-based system 5 comprises a control unit 70 for performing a variety of tasks for the processor-based system 5. In one embodiment, the control unit 70 comprises a processor. The control unit 70 is coupled to an input interface 74 and a media interface 84. The input interface 74 may be capable of interfacing with input devices such as the keyboard 17 (see FIG. 1), the mouse 19 (see FIG. 1), a microphone (not shown), and the like. The media interface 84 may interface with the floppy diskette drive 20 (see FIG. 1), the compact disc drive 22 (see FIG. 1), tape drive (not shown), and the like.

The processor-based system 5 comprises a memory 86 and a storage unit 88. The memory 86 may be a random access memory (RAM), which may be utilized to temporarily save information. The storage unit 88 of the processor-based system 5, in one embodiment, may be a hard drive. The storage unit 88 may store a Basic Input/Output System (BIOS), operating system, and other applications for the processor-based system 5. A scaling application 410 may be stored on the storage unit 88. Any one of a variety of operating systems may be installed on the processor-based system, including Windows, Disk Operating System (DOS), AIX, LINUX, and the like.

The control box 15 comprises a graphics interface 90. The graphics interface 90 provides graphics support for the computer 5. The graphics interface 90 accepts data to display, and processes the data so that it can be displayed on the display device 10. In one embodiment, the graphics interface 90 may be a graphics adapter that is adapted to interface with the display device 10 of the processor-based system 5. The graphics interface 90 in the illustrated embodiment includes a video memory 95 and an overlay engine 100. The graphics interface 90 may include a graphics engine (not shown) for providing conventional, non-video graphics support.

The video memory 95 (also commonly referred to as "frame buffer") may be high-speed random access memory for storing information that is ultimately displayed on the display device 10 of the processor-based system 5. The video memory 95 comprises an on-screen memory region 110, which stores an electronic representation, of one or more images that a user views on the display device 10 of the processor-based system 5. Thus, any updates to the on-screen memory region 110 are also reflected on the display device 10.

In one embodiment, the overlay engine 100 may overlay graphics or static images, for example, over an underlay, which typically comprises one or more images also viewable on the display device 10. The electronic representations of the overlay and underlay images are stored in the on-screen memory region 110. In the illustrated embodiment, however, although not so limited, the overlay engine 100 is a video overlay engine that is capable of merging video capture data with graphics data on the display device 10. In one embodiment, the overlay engine 100 may support a variety of data formats, including YUV 4:2:2, RGB15, RGB16, and RGB24. The overlay engine 100 in the illustrated embodiment is capable of generating an electronic representation of images from a source location (e.g., a location in the video memory 95 or other sources) to the display device 10 of the processor-based system 5. Generally, the electronic representations of images from the overlay engine 100 are placed on top of the underlay.

The overlay engine 100 includes a scalar 120, which in one embodiment, may be implemented in hardware. The scalar 120 may employ sophisticated scaling algorithms, for example, using interpolation and other filtering techniques, to achieve high-quality scaled images, in one embodiment of the invention. Additionally, the scalar 120 may be capable of multi-linear scaling, which means that filtering is performed using one or more vertical and horizontal taps. The term "taps," as utilized herein, comprises the number of input pixels that contribute to the building of each output pixel. The graphics interface 90 may support video overlay as one of the standard features. The Intel® i810 chipset, a modern graphics chipset offered by Intel Corporation, may be employed in the graphics interface 90 to provide the video overlay capability in accordance with one embodiment of the present invention.

Figure 3:
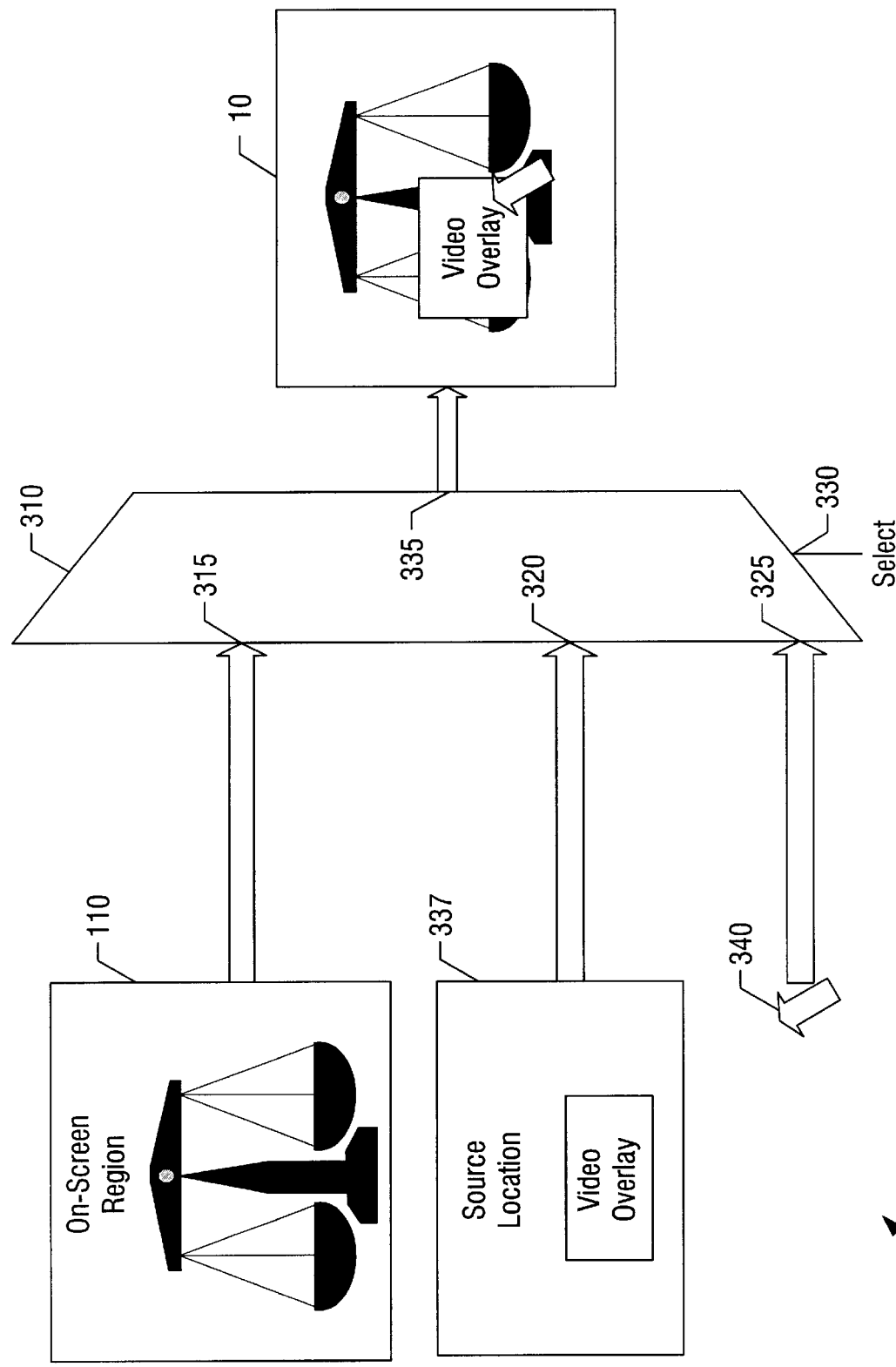
FIG. 3 is a stylized block diagram of a graphics adapter in accordance with the present invention.

Referring now to FIG. 3, a block diagram of the graphics interface 90 in accordance with the present invention is illustrated. It should be appreciated that the graphics interface 90 will generally have an associated device driver that interfaces between the graphics interface 90 and the software application attempting to access one or more features of the graphics interface 90.

The graphics interface 90 comprises a multiplexer block 310 having three input terminals 315, 320, 325, a select terminal 330, and an output terminal 335. The first, second, and third input terminals 315, 320, 325 are adapted to provide electronic representations for generating one or more images on the on-screen memory region 110, a source location 337 of the overlay engine 100, and a hardware cursor source 340, respectively. The source location 337, as utilized herein, refers to a memory space where the electronic representations of one or more images are stored before being processed by the overlay engine 100. In one embodiment, the source location 337 may be defined in the on-screen memory region 110 and may be identified by a source address that is provided to the overlay engine 100. The hardware cursor source 340, in one embodiment, references a location where an electronic representation of a hardware cursor is stored.

The select terminal 330 selects one or more signals from the input terminals 315, 320, 325 to ultimately be passed from the output terminal 335 of the multiplexer 310 to the display device 10. In one embodiment, the hardware cursor terminal 325 signal may have the highest priority of the three terminal signals, followed by the signal from the source location 337 of the overlay engine 100 and then the signal from the on-screen memory region 110, which may have the lowest priority.

The priority may be relevant when all three input terminals 315, 320, 325 provide display, image data. Referring to FIG. 3, an image stored as an electronic representation in the on-screen memory region (having the lowest priority in one embodiment) 110, is displayed on the display device 10 as an underlay. The underlay is overlaid by a second image, stored as an electronic representation in the source location 337 of the overlay engine 100. The image of the hardware cursor (having the highest priority in the one embodiment) from the hardware cursor source 340 is displayed on top of the overlay.

Figure 4:
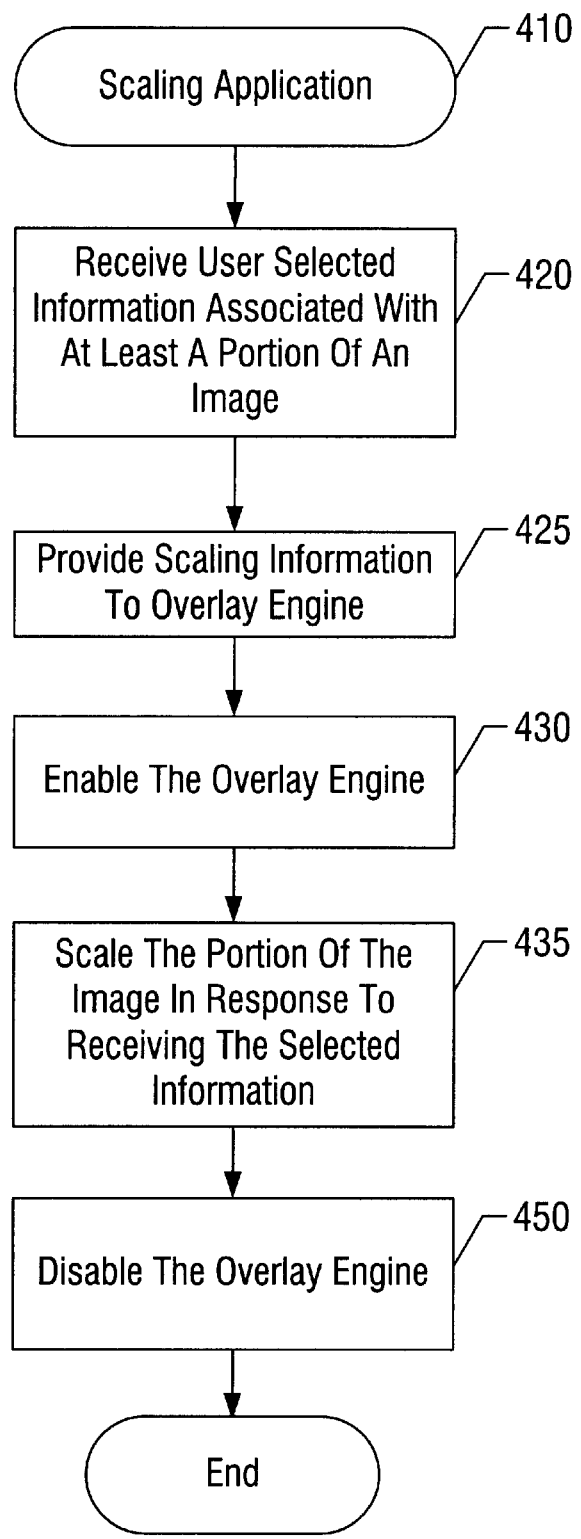
FIG. 4 is a flow chart for software resident on the processor-based system shown in FIG. 1, in accordance with one embodiment of the present invention.

Referring now to FIG. 4, a flow chart for a scaling application 410 in accordance with one embodiment of the present invention is illustrated. The scaling application 410 in one embodiment allows a user to select a portion of the image displayed on the display device 10 for scaling. The selected portion of the image may, for example, comprise text, graphics, pictures, or a combination thereof.

In one embodiment, the user may select the portion of the image by moving the mouse 19 (FIG. 1) to indicate the portion of the image to be scaled. In an alternative embodiment, the user simply clicks on or about a region proximate to the selected image portion to select a portion of the image for scaling. Additionally, in accordance with one embodiment of the present invention, the scaling application 410 also prompts the user to enter a factor that determines the amount of scaling (magnifying or shrinking) of the selected portion of the image. Alternatively, the scaling application 410 may use a default factor to scale the selected portion of the image.

At block 420, the scaling application 410 receives user selected information associated with the selected portion of the image on the display device 10. The user selected information in one embodiment may comprise coordinates of the selected portion of the image, or, alternatively, may comprise at least one coordinate along with a height and width value of the selected portion of the image. In yet another alternative embodiment, the user selected information may also include the scaling factor provided by the user.

At block 425, scaling information is provided to the overlay engine 100 based on the user selected information. The scaling information in one embodiment identifies a region in the on-screen memory region 110 that contains the electronic representation of the selected portion of the image. In one embodiment, the scaling application 410 provides the user selected information to a device driver of the overlay engine 100 through a predefined application programming interface (API). The device driver then, based on the user selected information, determines and provides the scaling information to the overlay engine 100. In an alternative embodiment, a user-defined API may be utilized to provide the user selected information to the graphics driver, where the user-defined API does not require the scaling application 410 to consume space in the on-screen memory region 110 of the video memory 95.

In one embodiment, the scaling information may comprise an address identifying a source location for the overlay engine 100, wherein the source location is the starting memory address of where the electronic representation of the selected portion of the image is stored. Additionally, the scaling information may comprise a height and a width value for the overlay engine 100, wherein the height and width values identify the location of the electronic representation of the selected portion of the image in the on-screen memory region 110. Alternatively, instead of the height and the width values, the scaling information may comprise another memory location that identifies an ending location of the electronic representation of the selected portion of the image (i.e., a memory location corresponding to a corner opposite of the corner indicated by the starting address location). In one embodiment, the scaling information may also comprise an overlay buffer pitch (or buffer stride), wherein the overlay buffer pitch is the number of bytes incremented on a line by line basis by the overlay engine. In one embodiment, the graphics driver of the overlay engine 100 determines the overlay buffer pitch and provides it to the overlay engine, if one is needed. In an another embodiment, the scaling information may also include the scaling factor provided by the user.

In the illustrated embodiment, although not so limited, the source location is defined as a memory location in the on-screen memory region 110 where the electronic representation of the selected portion of the image resides. The selected portion of the image need not necessarily reside in a continuous region within the on-screen memory region 110, and, instead, may be dispersed non-contiguously in the on-screen memory region 110.

In one embodiment, the scaled image is dynamically updated as the underlay changes. The source location of the overlay engine 100 in one embodiment is defined to be in the on-screen memory region 110 where the electronic representation of the selected portion of the image resides. Thus, as the underlay changes, the on-screen memory region 110 is updated, and these updates are thereby also reflected in the scaled image as well. The updates are reflected in the scaled image because the source location of the overlay engine 100 is also the updated on-screen memory region 110, in one embodiment. As a result, any modifications to the selective region of the underlay are also reflected in the scaled overlay, thereby providing a "dynamic" effect for the user.

In an alternate embodiment, the source location of the overlay engine 100 may point to another memory region that is external to the on-screen memory, region 110. In this case, the electronic representation of the selected portion of the image to be scaled may be copied from the on-screen memory region 110 to an off-screen region, which may be defined as part of the video memory region 95 or some other memory. In one embodiment, a BitBlt operation may be employed to copy the electronic representation of the selected portion of the image from the on-screen memory region 110 to the off-screen region.

At block 430, the scaling application 410 activates the overlay engine 100 using the select terminal 330 of the multiplexer block 310. At block 435, the overlay engine 100 utilizes its scalar 120 (see FIG. 2) to scale the electronic representation of the selected portion of the image. Instead of a separate scalar, one or more embodiments of the instant invention may take advantage of the scalar 120 of the overlay engine 100 for scaling. The overlay engine 100 may employ sophisticated scaling algorithms that interpolate and scale bi-linearly the input data to achieve a better quality image. Furthermore, in one embodiment, the scalar 120 may be implemented in hardware, which means that the scalar 120 may be more efficient and faster than some software-based scaling algorithms. At block 450, the scaling application 410 de-selects the overlay engine 100 through the select terminal 330 of the multiplexer block 310.

Figure 5:
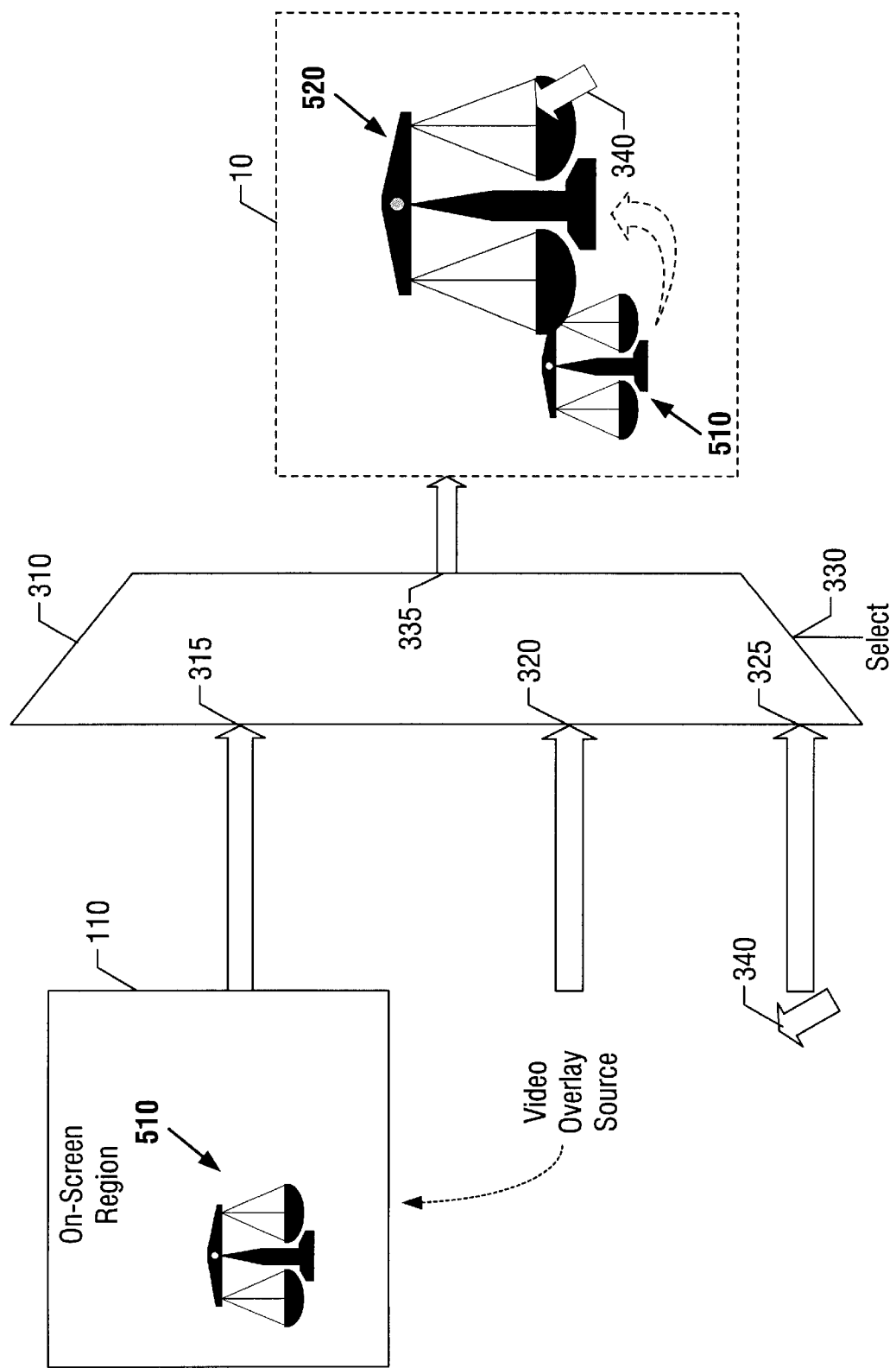
FIG. 5 illustrates a scaling operation in accordance with one embodiment of the present invention using the method of FIG. 3.

Referring now to FIG. 5, a scaling operation in accordance with one embodiment of the present invention is illustrated. Specifically, FIG. 5 illustrates an exemplary scaling operation using the scaling application of FIG. 4. For illustrative purposes, it is assumed that the user selects an image 510 to scale (enlarge) by a factor of two. Accordingly, at the block 420, the scaling application 410 receives the user selected information associated with the selected image portion 510. In the illustrated embodiment, the scaling application 410 may, for example, receive the scaling factor, as well as the coordinates associated with the image portion 510. The user-selected information is then provided to the device driver of the overlay engine 100, in one embodiment.

At the block 425, the scaling information is determined, based on the user-selected information, and is provided to the overlay engine 100. The scaling information in the illustrated embodiment may be an address identifying a source location for the overlay engine 100. The source location in this case corresponds to the memory location in the on-screen memory region 110 that stores the electronic representation of the image portion 510. Although not so limited, in the illustrated embodiment, the scaling information includes a height and width value for identifying the remaining electronic representation of the image portion 510 in the on-screen memory region 110. Additionally, if needed, the scaling information may include an overlay buffer pitch value, which, in one embodiment, may be provided by the device driver of the overlay engine 100.

At the block 430, the scaling application 410 activates the overlay engine 100 using the select terminal 330 of the multiplexer block 310. At the block 435, the overlay engine 100, using its scalar 120, scales the electronic representation of the image 510 by a factor of two, and provides the resulting data to the second input terminal 320. As a result, as can been seen in FIG. 5, the display device 10 shows a scaled image 520 that is placed over the image portion 510. The hardware cursor 340 is shown on top of the scaled image 520 since it may have a higher priority than the other two input signals of the multiplexer block 310.

Because the scaled image 520 is provided by the overlay engine 100, the contents of the on-screen memory region 110 remain undisturbed. It is thus possible for other applications to update the image portion 510 in the on-screen memory region 110. And since in the illustrated embodiment the source location of the overlay engine 100 directly references the electronic representation of the image 510 in the on-screen memory region 110 of the video memory 95, substantially all of the updates to image 510 may be dynamically reflected in the scaled image 520. This "dynamic" update feature may be useful when scaling graphical applications that are constantly changing, such as a weather map illustrating varying weather conditions.

Upon completion, the scaling application 410, at the block 450, disables the input signal from the overlay engine 100. The input signal from the overlay engine 100 may be disabled using the select terminal 330 of the multiplexer block 310.

The various system layers, routines, or modules may be executable control units (such as control unit 70 (see FIG. 2) in the processor-based system 5) Each control unit may include a microprocessor, a microcontroller, a processor card (including one or more microprocessors or controllers), or other control or computing devices. The storage devices referred to in this discussion may include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising: a controller to receive user selected information including a scale factor to scale the electronic representation of the portion of the image associated with at least a portion of an image on a display device; a memory region to store an electronic representation of the image; and a video overlay engine coupled to the controller, the video overlay engine to scale an electronic representation of the portion of the image, provide the scaled portion of the image to the display device as an overlay over the image on the display device, and dynamically update the scaled portion of the image.

2. The apparatus of claim 1, wherein the controller to receive the user selected information comprises the controller to receive coordinates corresponding to the portion of the image displayed on the display device.

3. The apparatus of claim 2, wherein the controller to receive the user selected information further comprises the controller to:
   determine memory location of the electronic representation of the portion of the image in an associated memory region based on the received coordinates, wherein the associated memory region comprises at least one memory location corresponding to at least one pixel of the display device; and
   provide the memory location to the overlay engine.

4. The apparatus of claim 3, wherein the video overlay engine to scale the electronic representation of the portion of the image comprises the video overlay engine to scale the electronic representation of the image residing in the associated memory region.

5. The apparatus of claim 4, further comprising the controller to:
   update the associated memory region that is occupied by the electronic representation of the portion of the image; and
   scale the electronic representation of the portion of the image in response to the update.

6. The apparatus of claim 1, further comprising a display to display the portion of the image.

7. The apparatus of claim 1, wherein the controller is a processor.

8. The apparatus of claim 1, wherein the video overlay engine to scale comprises the video overlay engine to scale the electronic representation of the portion of the image by a factor greater than one.

9. An article comprising one or more machine-readable storage media containing instructions that when executed enable a processor to: receive user selected information including a scale factor to scale the electronic representation of the portion of the image associated with at least a portion of an image on a display device; scale an electronic representation of the portion of the image using an overlay engine; and dynamically update the scaled portion of the image.

10. The article of claim 9, wherein the one or more machine-readable storage media contain instructions that when executed enable the processor to receive coordinates corresponding to the portion of the image displayed on the display device.

11. The article of claim 10, wherein the one or more machine-readable storage media contain instructions that when executed enable the processor to:
    determine the memory location of the electronic representation of the portion of the image in an associated memory region based on the received coordinates, wherein the associated memory region comprises at least one memory location corresponding to at least one pixel of the display device; and
    provide the memory location to the overlay engine.

12. The article of claim 11, wherein the one or more machine-readable storage media contain instructions that when executed enable the scaling of the electronic representation of the image residing in the associated memory region.

13. The article of claim 12, wherein the one or more machine-readable storage media contain instructions that when executed enable the processor to:
    update the associated memory region that is occupied by the electronic representation of the portion of the image; and
    enable the electronic representation of the portion of the image to be scaled in response to the update.

14. A method comprising: enabling a user to identify at least a portion of an image on a display device including receiving a scale factor to scale the electronic representation of the portion of the image; enabling scaling of an electronic representation of the portion of the image using an overlay engine; enabling display of the scaled portion of the image as an overlay over the image on the display device; and dynamically updating the scaled electronic representation.

15. The method of claim 14, wherein enabling the user to identify the portion of the image comprises enabling receiving coordinates corresponding to the portion of the image displayed on the display device.

16. The method of claim 15, wherein the display device has an associated memory region for one or more pixels of the display device, further comprising:
    enabling determining memory location of the electronic representation of the portion of the image in the associated memory region based on the received coordinates; and
    enabling providing the memory location to the overlay engine.

17. The method of claim 16, further including:
    allowing updates to the associated memory region that is occupied by the electronic representation of the portion of the image; and
    enabling scaling of the electronic representation of the portion of the image in response to the update.

18. The method of claim 17, wherein enabling scaling of the electronic representation of the portion of the image comprises enabling scaling of the electronic representation of the image residing in the associated memory region.

19. The method of claim 14, further comprising enabling displaying of the portion of the image.

20. The method of claim 14, wherein enabling scaling comprises enabling scaling the electronic representation of the portion of the image using a video overlay engine.

21. The method of claim 14, wherein enabling scaling comprises enabling scaling the electronic representation of the portion of the image by a factor greater than one.

22. A system, comprising: a display; a control box coupled to the display, the control box comprising: a controller to receive user selected information including a scale factor to scale the electronic representation of the portion of the image associated with at least a portion of an image on a display device; and an interface coupled to the controller, the interface comprising a video overlay engine to scale an electronic representation of the portion of the image; and a memory region to store an electronic representation of the image, the video overlay engine to provide the scaled portion to the display as an overlay over the image and dynamically update the scaled portion of the image.

23. The system of claim 22, wherein the controller to receive the user selected information further comprises the controller to associate the received coordinates to the electronic representation of the portion of the image in an associated memory region, wherein the associated memory region comprises at least one memory location corresponding to at least one pixel of the display device.

24. The system of claim 23, wherein the video overlay engine to scale the electronic representation of the portion of the image comprises the video overlay engine to scale the electronic representation of the image residing in the associated memory region.

25. A method comprising: selecting at least a portion of an image on a display device having an associated memory region corresponding to each pixel, including associating the selected portion of the image to an electronic representation of the portion of the image in the associated memory region; scaling an electronic representation of the portion of the image using a video overlay engine; enabling display of the scaled portion as an overlay over the image on the display device; and dynamically updating the scaled electronic representation.

26. The method of claim 25, wherein scaling the electronic representation of the portion of the image comprises scaling the electronic representation of the image residing in the associated memory region.

27. The method of claim 26, further including:

updating the associated memory region that is occupied by the electronic representation of the portion of the image; and scaling of the electronic representation of the portion of the image in response to the update.

\* \* \* \* \*